No. 632,050. Patented Aug. 29, 1899.
A. W. GRAY.
VEHICLE ATTACHMENT.
(Application filed Apr. 14, 1899.)
(No Model.)

WITNESSES:
Franck L. Ourand.
Jos. L. Coombs

INVENTOR.
Arthur W. Gray,
BY
Louis Bagger & Co.,
ATTORNEYS.

UNITED STATES PATENT OFFICE.

ARTHUR W. GRAY, OF KEOTA, IOWA.

VEHICLE ATTACHMENT.

SPECIFICATION forming part of Letters Patent No. 632,050, dated August 29, 1899.

Application filed April 14, 1899. Serial No. 713,024. (No model.)

*To all whom it may concern:*

Be it known that I, ARTHUR W. GRAY, a citizen of the United States, residing at Keota, in the county of Keokuk and State of Iowa, have invented new and useful Improvements in Vehicle Attachments, of which the following is a specification.

My invention relates to attachments for vehicles; and its object is to relieve the draft-animals and the occupant of the vehicle from the jars and jerks incident to travel, the construction being also such that in case of runaway or breakdown the animals can be readily detached from the vehicle.

The invention consists in the novel construction and combination of parts hereinafter fully described and claimed.

Figure 1:
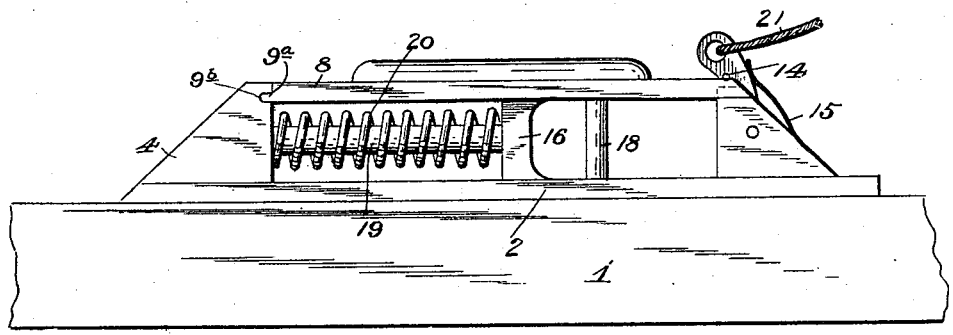
Figure 2:
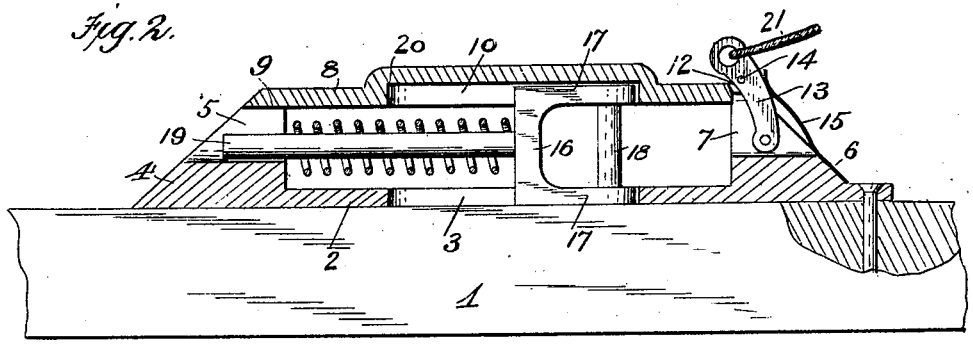
Figure 3:
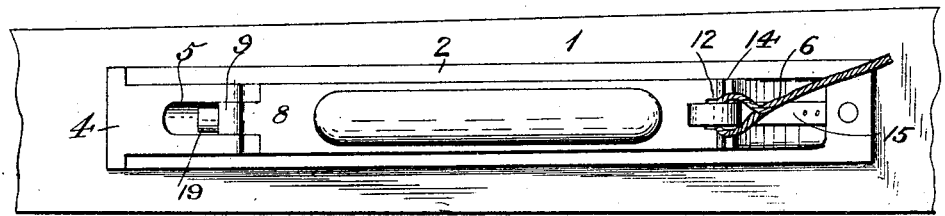

In the accompanying drawings, Figure 1 is a side elevation showing a vehicle pole or tongue provided with my improvements. Fig. 2 is a central longitudinal section of the same. Fig. 3 is a plan view.

In the said drawings the reference-numeral 1 designates a vehicle-pole of any ordinary or suitable description. Secured to this pole is a plate 2, formed with a longitudinal slot or opening 3. This plate is bolted to the pole and is provided at the front end with a head-block 4, formed with a slot 5 in its upper end to receive an arm or bar hereinafter described. At the opposite or rear end said plate is provided with an integral head-block 6, also formed with a slot 7.

The numeral 8 designates a longitudinal bar, the front end of which is formed with a lug 9, which engages the slot in the front cross-head block 4 and is pivotally connected with said head-block. This bar is also formed with projections 9ª, which engage with recesses 9ᵇ in said head-block. In its under side this bar is formed with a longitudinal groove 10, and the rear end is beveled and formed with a recess 12. Pivoted to the rear head-block 6 is a trigger 13, engaging with said recess, and is provided with a transverse pin 14, which engages with the upper side of said bar. A flat spring 15 is secured to the head-block 6, the free or upper end of which bears against the said trigger and holds it in engagement therewith. Working in the slot or opening 3 and the groove 10 is a slidable cross-head 16, formed with two rearwardly-extending arms 17, through which passes a bolt 18, which also passes through a whiffletree (not shown) when the device is in use. Secured to this cross-head is a forwardly-extending rod 19, the front end of which projects into the slot in the front head-block 4. Surrounding said rod is a coiled spring 20, one end of which abuts against the head-block 4 and the other end against the said cross-head. A cord 21 is secured to the said trigger and extends back to the vehicle, so as to be within easy reach of the occupant or occupants thereof.

The operation of the device is as follows: The attachment is secured to the pole or tongue of a vehicle by bolts or other suitable means, with the whiffletree passed between the arms of the cross-head and connected therewith by means of the bolt 18. As the vehicle is now drawn by the draft-animals the jars and jerks are taken up by the coiled spring, thus preventing injury to the animals and also relieving the occupant of the vehicle of the annoyance caused by the sudden changes of strain incident to the ordinary connections now in common use.

In case of a runaway or breakdown the occupant of the vehicle by pulling upon the rope or cord attached to the trigger can release the bar 8, so that the pull of the animals will cause the latter to be disengaged from the plate 1, and accidents thus be prevented.

Having thus fully described my invention, what I claim is—

1. In a vehicle attachment, the combination with the tongue or pole, of the plate secured thereto formed with a longitudinal opening and provided with head-blocks at the front end formed with a slot and recesses and with a rear head-block, of the removable plate provided with a lug and with projections engaging, respectively, the slot and recesses in the front head-block and the rear end of which is beveled and formed with a recess and resting on the rear head-block and means connected with said rear head-block for holding said plate in place, and the spring-actuated head to which a whiffletree is adapted to be connected, substantially as described.

2. In an attachment for vehicles, the combination with the pole or tongue, the plate secured thereto formed with a longitudinal slot or opening, and provided with head-blocks at the ends, of the removable bar having a lug at the front end engaging with a recess in the front head-block and formed with a groove in its under side and the spring-actuated trigger pivoted to the other or rear head-block and the spring-actuated crosshead with which a whiffletree is adapted to be connected, substantially as described.

3. In a vehicle attachment, the combination with the pole or tongue, the plate secured thereto having a longitudinal slot or opening and with a head-block at each end formed with slots or recesses, of the removable bar formed with a groove in its inner or under side and provided at one end with a lug and ears, the latter of which are adapted to engage with recesses in the front head-block, and the other end resting on the rear head-block, the trigger pivoted to the rear head-block, the cord connected therewith, the spring bearing against said trigger, the crosshead working in the opening and groove of said plate and bar, and provided with two arms, the pin or bolt passing therethrough with which a whiffletree is adapted to be connected, the rod connected with said crosshead and the coiled spring, substantially as described.

In testimony whereof I have hereunto set my hand in presence of two subscribing witnesses.

ARTHUR W. GRAY.

Witnesses:
E. W. NORTER,
J. E. WARRINGTON.